United States Patent [19]
Bulow

[11] Patent Number: 5,315,370
[45] Date of Patent: May 24, 1994

[54] INTERFEROMETRIC MODULATOR FOR OPTICAL SIGNAL PROCESSING

[76] Inventor: Jeffrey A. Bulow, 209 Granger Rd., West, Syracuse, N.Y. 13219

[21] Appl. No.: 780,786

[22] Filed: Oct. 23, 1991

[51] Int. Cl.⁵ ............................................. G01B 9/02
[52] U.S. Cl. .................... 356/345; 356/349; 356/358
[58] Field of Search ............ 356/345, 346, 350, 358, 356/356, 349

[56] References Cited

U.S. PATENT DOCUMENTS

| | | | |
|---|---|---|---|
| 3,193,693 | 3/1980 | Schindler | 356/346 |
| 3,563,663 | 2/1971 | Barringer | 356/346 |
| 3,969,578 | 7/1976 | Mezrich et al. | 356/345 |
| 4,171,159 | 10/1979 | White | 356/349 |

Primary Examiner—Samuel A. Turner
Attorney, Agent, or Firm—Lalos & Keegan

[57] ABSTRACT

An interferometric modulator uses a beamsplitter to produce deflected and transmitted light beams onto mirrored surfaces of a piezoelectric crystal pair, one piezoelectric crystal being driven by a modulating voltage signal, whereupon the light beams are reflected back to the beamsplitter to produce a modulated optical output signal, with the modulator being especially adaptable for use as an digital photonic clock, as a pulse width/amplitude modulator, and as a bistable optical memory cell.

39 Claims, 7 Drawing Sheets

θ IS PHASE OF ENVELOPE
φ IS PHASE OF CARRIER (a)

(b)

INTERFEROMETRIC MODULATOR FOR OPTICAL SIGNAL PROCESSING

FIELD OF THE INVENTION

The present invention relates generally to computer optical processing circuits using interferometric techniques, and more specifically, to an interferometric modulator for optical signal processing. The invention further contemplates an interferometric modulator that is particularly suitable for use as a digital photonic clock, as a pulse width/amplitude modulator, and as a bi-stable optical memory cell.

BACKGROUND OF THE INVENTION

Efforts are constantly being made to improve the efficiency of processing time in state of the art computers. In the area of optical computing, semiconductor circuitry is operated at optimized semiconductor rates, and electronic signals are changed to optical signals by the computer's semiconductor micro-circuitry in an effort to speed up the computer processing time. Still, the computer processing rate could be made faster if electronic signals are independently converted into optical signals using a dedicated electro-mechanical process prior to receipt and/or use of the electronic signal by the computer. A high speed optical signal is provided as an input to the computer's central processing unit (CPU). The high speed optical signal is used to govern the processing rate within the computer's CPU.

Optics have also been used in measurement circuits. A corrective circuit, as was applied with some notoriety in connection with the Hubbell telescope, used interference optics as a means for fine measurement of a curved surface. Optical interferometry has also been used to determine subtle changes in the optical refractive index of optically transmissive gases as a measure of pressure or concentration.

While optics have been heretofore used primarily in areas of audio signal processing, image processing and also in detection and measurement circuitry, there has been little application in the use of optical processing for signal generation and signal processing beyond the transformation of an electronic signal in a computer's internal signal processing circuitry.

SUMMARY OF THE INVENTION

In view of the foregoing, the present invention has been developed to provide circuitry and apparatus for utilizing electronic signals to create specialized optical signals by use of an interferometric modulator. An interferometric modulator uses controlled, dynamic interferometry and an optical source to create and process optical signals. It is a principal object of the present invention to provide an interferometric modulator for electromagnetic (e.g. optical) signals, which would have applications in computers and other processing networks.

A further object of the present invention is to provide an interferometric optical modulator which can be utilized as a digital photonic clock circuit, a pulse width/amplitude modulator circuit, and a bi-stable optical memory cell circuit.

In accomplishing these and other objectives, an interferometric modulator for optical carrier signals is provided comprising a piezoelectric crystal having a mirrored surface, either polished, applied, or attached, a controlled driving voltage applied to the piezoelectric crystal, and a light beam deflected by a beamsplitter whereby at least a portion of the light beam is reflected from and a portion is transmitted by the beamsplitter interface and recombined at the same interface to produce an output optical signal which is interference modulated as a function of the controlled driving voltage.

BRIEF DESCRIPTION OF THE DRAWINGS

These and other objects and features of the present invention will become apparent from the following description with reference to the accompanying drawings, in which.

DETAILED DESCRIPTION OF THE PREFERRED EMBODIMENTS

Figure 1:
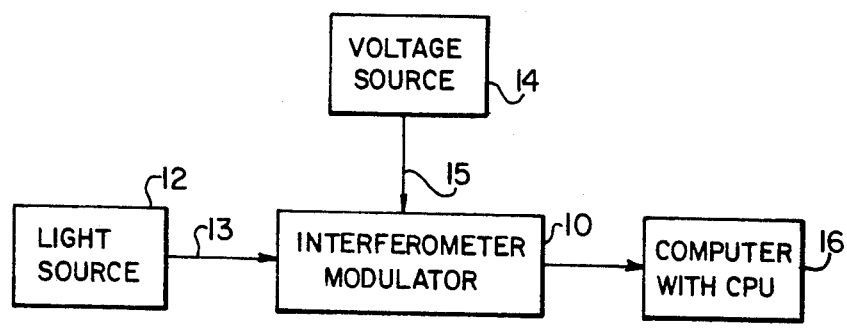
FIG. 1 is a block diagram of a set of interferometric modulators according to the invention arranged as a digital photonic clock showing outside light and voltage sources applied to each interferometric modulator of the clock for producing an optical signal as an input to a computer's CPU.

Referring to FIG. 1, a set of interferometric modulators 10 arranged as a digital photonic clock is shown connected to a source 12 (e.g. light source) that provides an electromagnetic carrier signal on line 13, and to a voltage source 14 that provides an electrical modulator signal on line 15. It should be noted that the electromagnetic carrier signal is not limited to the optical rang but may be in the ultraviolet, infrared or any range of oscillating electromagnetic radiation that is suited to a specific application. Light source 12 produces a monochromatic beam of light, such as from a laser at frequency $f_L$. The output from the interferometric modulator is delivered to a computer 16, and more particularly, to an input-output controller or to the CPU of the computer.

Figure 2:
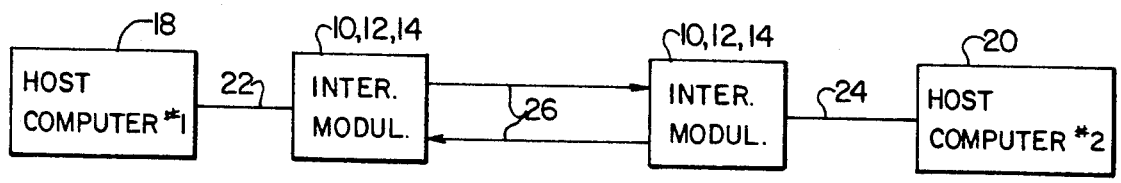
FIG. 2 is a block diagram depicting two sets of interferometric optical modulators of the invention each set arranged as a digital photonic clock. Each clock is used as an input/output interface handler (controller) between host computers.

FIG. 2 is a block diagram of a set of interferometric modulators, arranged as digital photonic clocks, each clock including a light source 12 and a voltage source 14, utilized as an interface to a computer in a system where two host computers 18, 20 are communicating with one another. The connections 22, 24 between each digital photonic clock and its respective host computer 18, 20 generally cover a short distance since the clock would in most instances be attached directly to the structure, such as to an optical terminal, of the computer's input/output controlling processor. Alternately, the digital photonic clock may be internal to the computer but would be independent from the semiconductor processing circuitry of the computer. The interconnecting lengths between the host computers would typically be of greater relative distances with the connections 26 utilizing fiber optics in the preferred embodiment. It will be appreciated, however, that various types of known transmission mediums could be used in such a system, such as direct wire, waveguide or microwave links.

One application particularly suitable for the system of FIG. 2 is a mobile car telephone used in connection with a satellite communication system where the satellite serves as a repeater in providing service to rural areas. Major problems to be overcome in such an application is background noise, band width and the volume of traffic on the system links, all of which are a function of the data rate and carrier frequency. Data accuracy and the number of available channels are also problems that must be overcome in this application. The use of an optically modulated signal using interferometric techniques, according to the invention, is particularly suitable in such a system, as represented by the block diagram of FIG. 2, where the host computers are used as communications network controllers.

Figure 3:
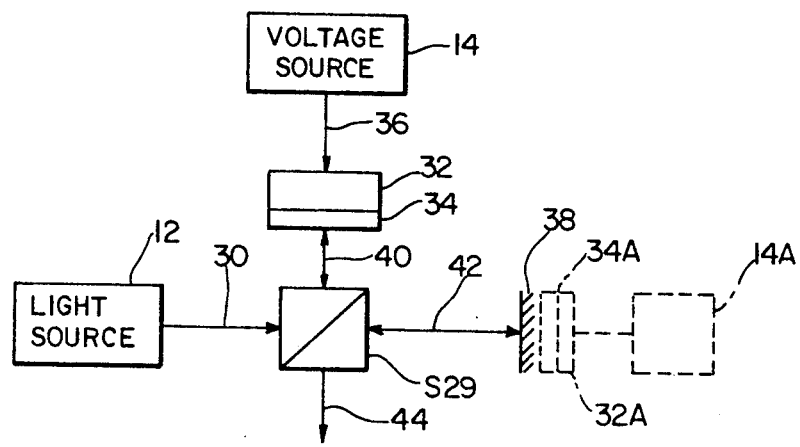
FIG. 3 is an illustration of the apparatus of a single interferometric modulator according to the invention.

Turning now to the structural details of a single interferometric optical modulator, FIG. 3 shows a beamsplitter S29 which receives a light beam 30 from light source 12. Light beam 30 (i.e. optical signal) will have a fundamental frequency as controlled by source 12. A piezoelectric crystal 32 with a mirrored surface 34 is positioned a distance from and facing one side of beamsplitter S29, shown above the beamsplitter in the drawing of FIG. 3. A voltage source 14 provides a signal having a given amplitude and frequency, which is applied (on line 36) to piezoelectric crystal 32 as the modulating signal. A fixed mirrored surface 38 is positioned a distance from and faces another side of beamsplitter S29, shown to the right of the beamsplitter in the drawing of FIG. 3. Alternately, fixed mirrored surface 38 could be replaced with a piezoelectric crystal 32A with a mirrored surface 34A, connected to a voltage source 14A for producing a signal having a predetermined phase relationship to the signal produced by voltage source 14.

Light beam 30 impinges on beamsplitter S29, whereupon a portion (approximately half in the preferred embodiments) 40 of light beam 30 is reflected by the beamsplitter and impinges on the mirrored surface 34 of the piezoelectric crystal and is reflected back to the beamsplitter. A transmitted portion (approximately half in the preferred embodiments) 42 of light beam 30 is transmitted by the beamsplitter and impinges on mirrored surface 38 and is likewise reflected back to the beamsplitter. The reflected signal portion 40 and transmitted signal portion 42 will have a respective phase relationship. The optical path length of signal 40 will be determined by the distance of between beamsplitter S29 and mirrored surface 34. Similarly, the optical path length of signal 42 will be determined by the distance between beamsplitter S29 and mirrored surface 38 (or 34A). The two signals 40 and 42 return and recombine in beamsplitter S29 and emerge as output signal 44. The reflected light beam 40 is modulated, e.g. along the optical path length axis of mirrored surface 34, by the motion of mirrored surface 34 and by its impingement on the mirrored surface 34. Mirrored surface 34 is being driven by a signal provided by voltage source 14. The modulation of the reflected light beam 40 from mirrored surface 34 is a function of the amplitude and frequency of the signal generated by voltage source 14. This modulated optical signal recombined with unmodulated, but reflected, light beam 42 appears at the output of the beamsplitter and as the output of the interferometric modulator. As the piezoelectric crystal 32 responds to the modulating electrical signal (on line 36) from voltage source 14 the distance between mirrored surface 34 and beamsplitter S29 varies, as does the optical path length of reflected signal portion 40 and the respective phase relationship between signal portions 40 and 42. When these signals recombine at beamsplitter S29, they result in a modulated output signal 44 having a fundamental frequency determined by the varying phase relationship between the signal portions 40 and 42. In an alternate embodiment, utilizing piezoelectric crystal 32A with mirrored surface 34A and voltage source 14A, it is the optical path length of transmitted signal portion 42 that is varied. Modulating or varying the transmitted signal portion provides an equivalent function to modulating or varying the reflected signal portion in the present invention. Choosing to modulate or vary the received or transmitted signal portion, or both, is a matter of design choice in a given application.

It is understood that conventional voltage source 14 could produce any wave shape, such as a sine wave, a saw-toothed wave, etc. In that regard, the interferometric modulator is also a signal synthesizer in that the wave shape of the output signal can be changed and specifically designed by changing the waveshape of the signal from voltage signal source 14. Utilization of a piezoelectric crystal 32A with mirrored surface 34A rather than a fixed position mirror 38, and a second voltage source 14A provides even greater flexibility in forming the wave shape of the output signal.

Building on this interferometric technique for producing a modulated optical signal, three particular applications are especially suitable for its use, namely as a digital photonic clock, as a pulse width/amplitude modulator and as a bi-stable memory cell. The description of each application according to the invention is next separately presented.

Digital Photonic Clock

Figure 4:
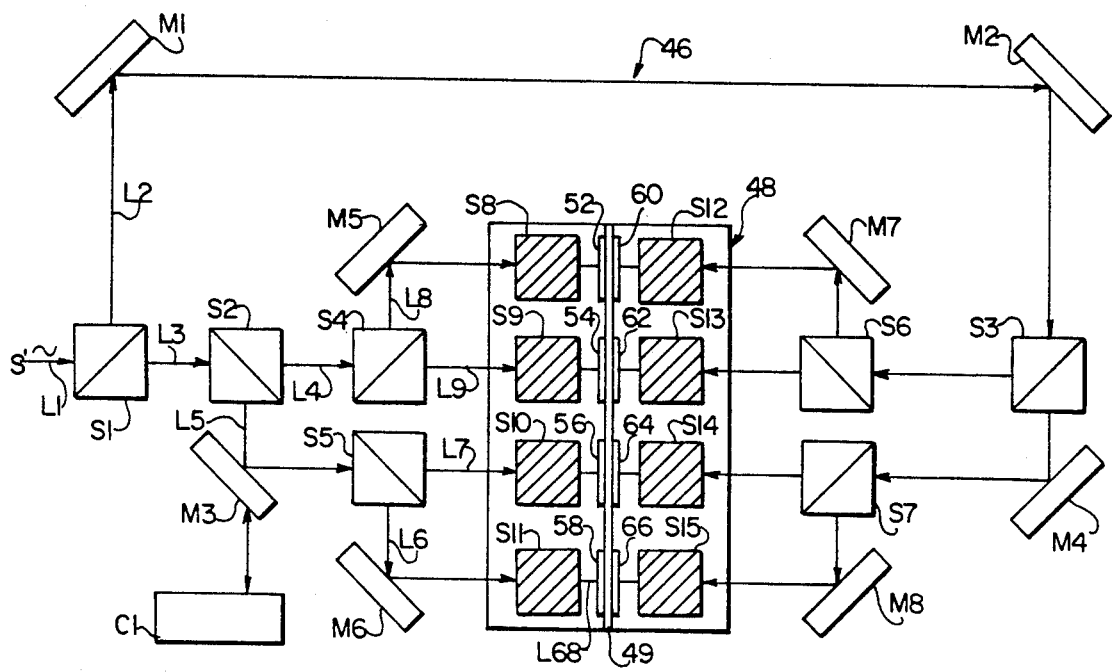
FIG. 4 is a partial top view of an arrangement of interferometric modulators according to the invention utilized as a digital photonic clock.

FIG. 4 illustrates a portion of an embodiment of the present invention in which an arrangement of interferometric modulators (labelled generally as 46) is utilized as a high speed digital photonic clock. A light source S' producing a monochromatic beam of light, such as from a laser, delivers a light beam along line L1 at an optical frequency $f_L$ as an input to the interferometric modulator. The interferometric modulator comprises, in part, beamsplitters S1, S2, S4 and S5, and reflective mirrors M3, M5 and M6 in the arrangement as shown on the left side of the structure of FIG. 4. The interconnecting lines represent paths of light between the beamsplitters and the mirrors.

A similar arrangement exists on the right side of the structure of FIG. 4 comprising beamsplitters S3, S6 and S7, and reflective mirrors M4, M7 and M8. Mirrors M1 and M2 are also positioned as shown, with the arrowed interconnecting lines again representing the path of light beams between the various elements.

Figure 5:
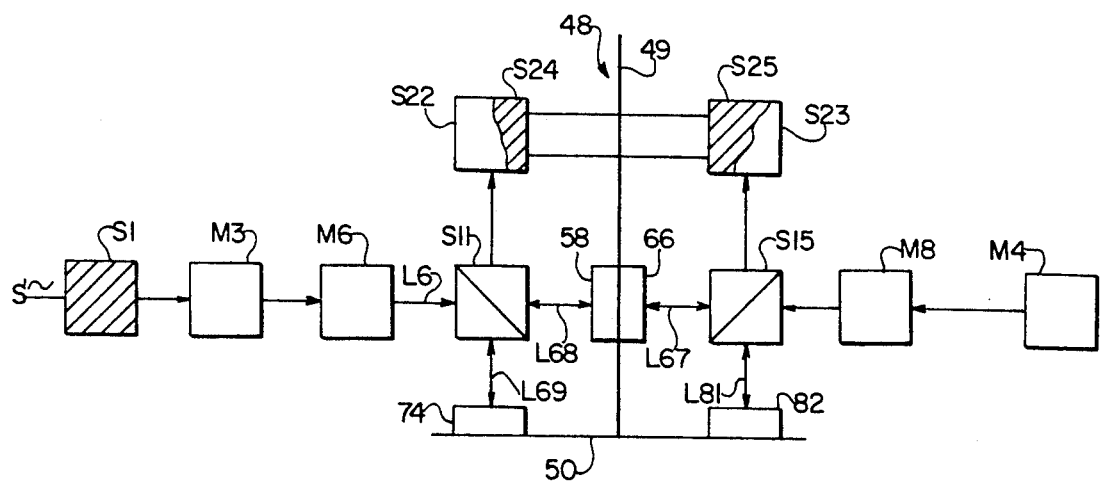
FIG. 5 is a front elevational view of the apparatus of FIG. 4.
Figure 6:
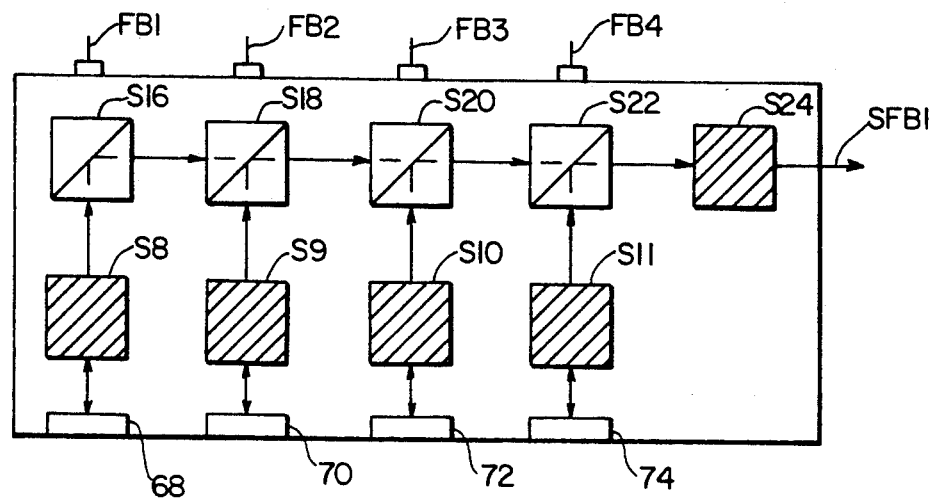
FIG. 6 is a partial side view of the apparatus of FIG. 4 showing the upper and lower beamsplitter arrangement.
Figure 8:
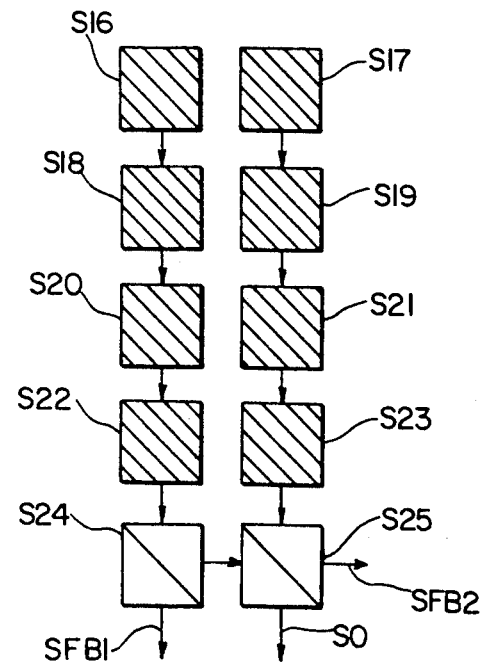
FIG. 8 is a partial top view of the apparatus of FIG. 4 showing only the arrangement of the upper set of beamsplitters.

In the center area of FIG. 4 is a rigid structure 48 in the form, primarily, of an inverted T-shape when viewed in the elevational view of FIG. 5. Structure 48 consists of a T-arm 49 extending vertically upright and a T-base 50, and additional structure (not shown). The T-shaped structure will, in practice, comprise the primary rigid mechanical framework against which the optical components are precision fit and supported with conventional mechanical spacers, brackets, guides and binding material. Mounted outward from either side of the rigid T-arm are two top sets and two bottom sets of beamsplitters. For illustration purposes, only the two bottom sets comprising beamsplitters S8, S9, S10 and S11 on the left side, and beamsplitters S12, S13, S14 and S15 on the right side of T-arm 49, are shown in FIG. 4. In reality, the top set of beamsplitters is mounted directly above the bottom set shown in FIG. 4. The top set of beamsplitters S16-S23 is shown in FIGS. 6 and 8, discussed hereinafter. In addition, the arrangement includes top beamsplitters S24 and S25, which are shown in FIGS. 5, 6 and 8, and discussed hereinafter. In each of the Figures the blocks depicting certain beamsplitters (e.g. S8-S15 in FIG. 4) are shaded to distinguish their orientation from the beamsplitters that are not shaded (e.g. S2-S7 in FIG. 4).

Beamsplitters S8-S25 are mounted by means of ancillary mechanical components which extend from, and attach to the rigid mechanical structure 48. For clarity in the drawing, the ancillary mechanical components are not shown in FIG. 4.

FIG. 5 is a front elevational view of the digital photonic clock 46. Beamsplitters S22 and S23 are mounted directly above beamsplitters S11 and S15, respectively. Beamsplitters S24 and S25 are above and forward (out of the page as shown in FIG. 5) of beamsplitters S11 and S15, respectively. FIG. 5 shows the arrangement of two piezoelectric crystal pairs, with each one of the pairs positioned at a 90° angle to one another facing two sides of a beamsplitter. The function of the piezoelectric crystals can be described with reference to FIG. 5. For example, light beam L6 impinging on beamsplitter S11 is split into a transmitted portion L68 which impinges on, and is reflected from, crystal 58, and a reflected portion L69 which impinges on, and is reflected from, crystal 74. Both crystals 58 and 74 are connected to a voltage source, not shown in FIG. 5. The arrangement of piezoelectric crystals connected to a voltage source is shown in FIG. 3 and is discussed in more detail in connection with FIG. 3. The two signals reflected back from the crystals 58, 74 then recombine in beamsplitter S11 and are output from a fourth side of the beamsplitter, upwardly to impinge on beamsplitter S22 directly above beamsplitter S11.

The side elevational view of FIG. 6 also shows beamsplitter S22 located directly above beamsplitter S11. The upper set of beamsplitters comprises beamsplitters S16, S18, S20, S22 and S24 on the left side of T-arm 49 as shown in FIG. 6, and beamsplitters S17, S19, S21, S23 and S25 (FIG. 8) on the opposite side of T-arm 49.

With the exception of beamsplitters S24 and S25, each upper beamsplitter receives recombined light signals from the respective beamsplitter positioned directly below it. The light beam signals are reflected and combined by the two top sets of beamsplitters according to the arrowed paths as shown in FIG. 6 with respect to elements on one side of T-arm 49. It is understood that a similar operation occurs with respect to the elements on the opposite side of the T-arm. Intermediate signals from beamsplitters S16, S18, S20, S22 and S24 may be fed back on lines FB1, FB2, FB3, FB4 and SFB1, respectively for analysis and control by a controller (e.g. servo-control C1 in FIG. 4).

Figure 7:
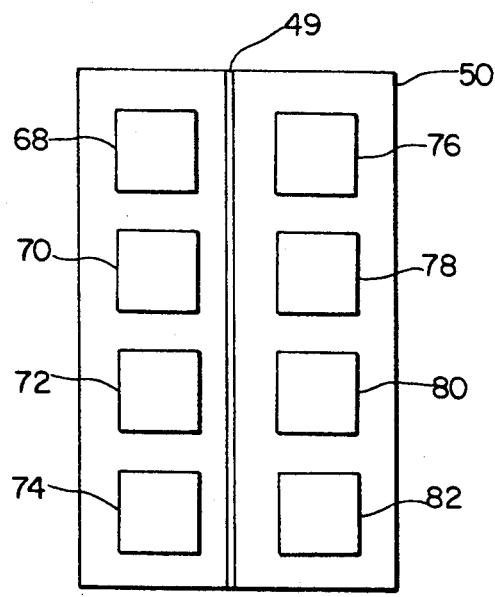
FIG. 7 is a partial top view of the apparatus of FIG. 4 showing only the bottom piezoelectric crystal arrangement.

FIG. 7 illustrates the position of the piezoelectric crystals mounted on T-base 50, with crystals 68, 70, 72 and 74 on the T-base on the left side of T-arm 49, and crystals 76, 78, 80 and 82 on the T-base to the right side of T-arm 49. FIG. 8 illustrates the position of the upper set of beamsplitters, which comprises beamsplitters S16-S25. Another intermediate feedback signal can also be provided on line SFB2 as shown in FIG. 8. The final optical square wave signal is provided on line S0. This signal may be utilized as a digital photonic clock signal for a computer CPU, for example. The assembly mounted to structure 48 thus comprises 16 piezoelectric crystals and 18 beamsplitters in the arrangement as depicted in FIGS. 4–8.

Each beamsplitter S8–S15 has associated with it two piezoelectric crystals positioned at a 90° angle to one another. FIG. 4 shows eight piezoelectric crystals attached flush on either side of T-arm 49 of structure 48, each facing a respective beamsplitter. With reference to FIG. 4, piezoelectric crystals 52, 54, 56 and 58 are positioned on the left side of T-arm 49, and piezoelectric crystals 60, 62, 64 and 66 are positioned on the right. The remaining eight piezoelectric crystals are positioned directly below each beamsplitter S8-S15 and therefore are not visible in FIG. 4. FIG. 7 illustrates these remaining crystals 68, 70, 72, 74, 76, 78, 80 and 82. Each piezoelectric crystal has a mirrored finished surface for reflection of any light beam that impinges on it. Light beams that impinge on each crystal are due to the alignment between a beamsplitter and its respective pair of piezoelectric crystals, e.g., beamsplitter S8 and piezoelectric crystals 52 and 68, beamsplitter S9 and piezoelectric crystals 54 and 70, etc. Due to space limitations in the drawing of FIG. 4, only the light beam line between piezoelectric crystal 58 and beamsplitter S11 is identified by number L68, although it is understood that the other similar connecting lines are likewise representative of light beams passing between piezoelectric crystals and their associated beamsplitter. See, for example, FIG. 5 which illustrates light beams L68 and L69 between beamsplitter S11 and its respective crystal pair 58 and 74, and light beams L67 and L81 between beamsplitter S15 and its respective crystal pair 66 and 82.

Mirrors M1 and M2 provide an optical connecting path for a beam of light between beamsplitter S1 on the left side of FIG. 4 and beamsplitter S3 on the right side of FIG. 4.

In operation, a coherent, focused monochromatic beam of light from source S' is received by the interferometric modulator as an input signal incident on beamsplitter S1. It is understood that beam of light L1 could also be comprised of several monochromatic beams which are coherent within each monochromatic beam.

Beamsplitter S1 divides the light beam into two equal, orthogonal beams L2 and L3, having a phase difference of approximately $\pi$, for example, between them upon leaving the transmitting/reflecting interface of beamsplitter S1. Light beam L2, as the reflected portion of light beam L1, is reflected by fully reflective mirrors M1 to M2 and then to beamsplitter S3. The transmitted portion L3 of the light beam from beamsplitter S1 impinges upon beamsplitter S2.

From this point on, the operation is duplicated on both sides of the rigid structure 48. The discussion which follows only describes the steps which occur with respect to the beamsplitters, mirrors, and piezoelectric crystals on the left side of T-arm 49, with it being understood that a duplicate operation is also occurring throughout the analogous components on the right side of T-arm 49.

Light beam L3 is split by beamsplitter S2 with the reflected portion represented by light beam L5, which is reflected by mirror M3 and thereafter impinges on beamsplitter S5. The transmitted portion L4 of light beam L3 impinges on beamsplitter S4.

The precise positioning of mirror M3 is adjustable by means of an opto-electronic monitoring circuit C1 comprising a conventional electro-mechanical servo-control. The feedback for this servo-control is provided by comparing the feedback signals on lines FB1 and FB2 with FB3 and FB4 (FIG. 6). By doing so, the phase of the light beam L5 reflected off mirror M3 to the transmitted portion of light beam L3, light beam L4, is appropriately matched. Mirrors M5 and M6 can be adjusted by similar means. The associated adjustment circuitry, which is conventional, is not shown in FIG. 4. The matching functions for these adjustments are empirically determined using feedback signals FB1, FB2 and FB3, FB4; FB1 and FB2; FB3 and FB4. The physical adjustments are made by varying the optical path length values between beamsplitter S2 and mirror M3, beamsplitter S4 and mirror M5, and beamsplitter S5 and mirror M6, respectively. Similar adjustments may be made to mirror M1 to match collective phases of signals on the right half of T-arm 49 to those on the left side of T-arm 49. Feedback signals SFB1 and SFB2 are used to measure the effectiveness of this adjustment.

The beam of light incident on beamsplitter S5 is split into a transmitted portion L7 and a reflected portion L6. The reflected light beam L6 is reflected by mirror M6 and impinges on beamsplitter S11. The transmitted portion L7 impinges on beamsplitter S10. A similar operation occurs with the beam of light L4 incident on beamsplitter S4 where it is split into a reflective light beam L8 which is reflected by mirror M5 and impinges on beamsplitter S8. The transmitted light beam L9 impinges on beamsplitter S9. With a similar and analogous operation having occurred throughout the components to the right side of structure 48, beamsplitters S8–S15 each receive a light beam. The orientation of beamsplitters S8–S15 is such that a portion of the received light is reflected downward (into the page). A portion of the received light is transmitted to the right of each of beamsplitters S8–S11. A portion of the received light is transmitted to the left of each of beamsplitters S12–S15. Both the reflected and transmitted portions of the light beams from each of beamsplitters S8–S15 impinge upon a surface of a piezoelectric crystal. As previously discussed, each of beamsplitters S8–S15 has associated with it a pair of piezoelectric crystals that are positioned at a 90° angle to one another.

The next process that occurs at each of the beamsplitters S8–S15 is identical where eight beams of light, whose amplitudes may be adjusted through the use of neutral density filters (not shown) in select light paths, are received by the eight separate beamsplitters. Therefore only operations involving beamsplitter S11 will be discussed as follows, such operations being representative of the action occurring at each of the beamsplitters S8–S15.

As best shown in FIG. 5, light beam L6, incident on beamsplitter S11, is split into two paths, one reflected beam L69 goes downward to piezoelectric crystal 74. The transmitted portion of the beam L68 impinges on piezoelectric crystal 58. The two light beams from beamsplitter S11 are each incident on a mirrored surface of the two piezoelectric crystals 74 and 58 associated with beamsplitter S11. Further, the piezoelectric crystals are oscillating at a specified frequency and amplitude, determined by a control voltage applied to the piezoelectric crystals (as shown in and discussed with reference to FIG. 3). Each pair of crystals, one pair for beamsplitter S8, one pair for beamsplitter S9, etc., up to beamsplitter S15, oscillate at different specified frequencies which are prescribed harmonics of a fundamental frequency. Typically, the fundamental frequency drives one pair of piezoelectric crystals, e.g. 74 and 58 for beamsplitter S11.

The phase relationship between the two crystals associated with any one of the beamsplitters S8–S15 is adjustable, or tunable, to optimize the output signal of each component. The two beams of light reflected from each of the two piezoelectric crystals associated with beamsplitter S11 are recombined at S11 due to their reflection from the mirrored surface of the two piezoelectric crystals. The phase, amplitude and frequency of the control voltage applied to the piezoelectric crystal, which determines the position and speed of the mirrored surface thereof, are adjusted to produce a sinusoidal optical signal as the output of the two recombined signals from beamsplitter S11. The amplitude of the mechanical motion of the surface of a piezoelectric crystal produces a sinusoidal signal with a frequency that is 100 to 1,000 times the frequency of the signal from the voltage source. In other words, the mechanical motion of the mirrored surface of the crystal is determined by the voltage, and has a distance of movement (amplitude) of 50 to 500 times lamda, where lamda is the wavelength of the carrier light source S'. The maximum optical path length difference at each beamsplitter interface is 2 times the mechanical peak-to-peak amplitudes of the mirrored surfaces when the optical axis is normal to the mirrored surface. This produces an output signal from the recombined light beams having a frequency $f_2$ contribution = (100 to 1,000) $f_L$ from each arm of the interferometric modulator, where $f_L$ equals the driving frequency.

Empirically obtained adjustments are made to optimize the clock performance as a function of the change in path length traversed by the light as a result of the motion of the mirrored surfaces of the piezoelectric crystals. That change in path length is equal to twice the peak to peak difference in the mechanical amplitude of the mirrored surface along each optical path.

In the preferred embodiment, the control voltage signals applied to the piezoelectric crystals are sine waves where the phase difference between control voltages signals on each pair is $\pi/2$. For example, the control voltage signal applied to crystal 74 will be $\pi/2$ out of phase with the control voltage signal applied to crystal 58. However, other signals could also be used for producing a desired digital or arbitrarily shaped output.

The sinusoidal signals that result after reflection from the mirrored surfaces of the piezoelectric crystals, and as a result of their recombination in the respective beamsplitters S8–S15 is called classical interferometry. The resulting digital signal output signal occurs as specific contributions of sinusoidal light signals of specified frequency and amplitude are combined to produce a final output signal. This final output signal is the superposition or combining of each of the sinusoidal input signals. If the appropriate values of amplitude, phase and frequency of the driving signals are correctly applied to each piezoelectric crystal, then the superposition of the sinusoidal signals will be a digital signal. The digital clock signal is produced as output signal S0 from beamsplitter S25 in FIG. 8. The appropriate amplitude, phase and frequency values of the driving signals must be obtained empirically. Consider, for example, the superpositioning of the first (e.g. on crystal pair 52/68), third (e.g. on crystal pair 54/70), fifth (etc.), seventh, ninth, eleventh, thirteenth and fifteenth harmonics of a known fundamental, i.e., the first harmonic sine wave, with the amplitudes of each subharmonics adjusted to optimize the digital output. This optimization can be achieved by adjusting the phase, relative amplitude and/or frequency of each signal applied to each set of piezoelectric crystals that correspond to a particular beamsplitter. This optimization may also be achieved in part by adjusting the thickness (strength) of the neutral density filters used to regulate the amplitude of each light beam. The optimal result is achieved through empirical tests.

An Optical Pulse Width/Amplitude Modulator

The use of the interferometric modulator of the present invention together with appropriate electromechanical servo-controls can be applied to produce an optical pulse width modulator with a modulating capability from a $>0\%$ to a $<100\%$ duty cycle for a symmetric square wave optical input with negligible slew loss. Such an optical modulator incorporates multistage phase inversion and recombination to achieve the desired results. The structure of the device offers added versatility in that it may be implemented, not only as a dynamically controlled pulse width modulator, but also as a fixed width precision frequency doubler, or as an optical digital signal rectifier.

Figure 9:
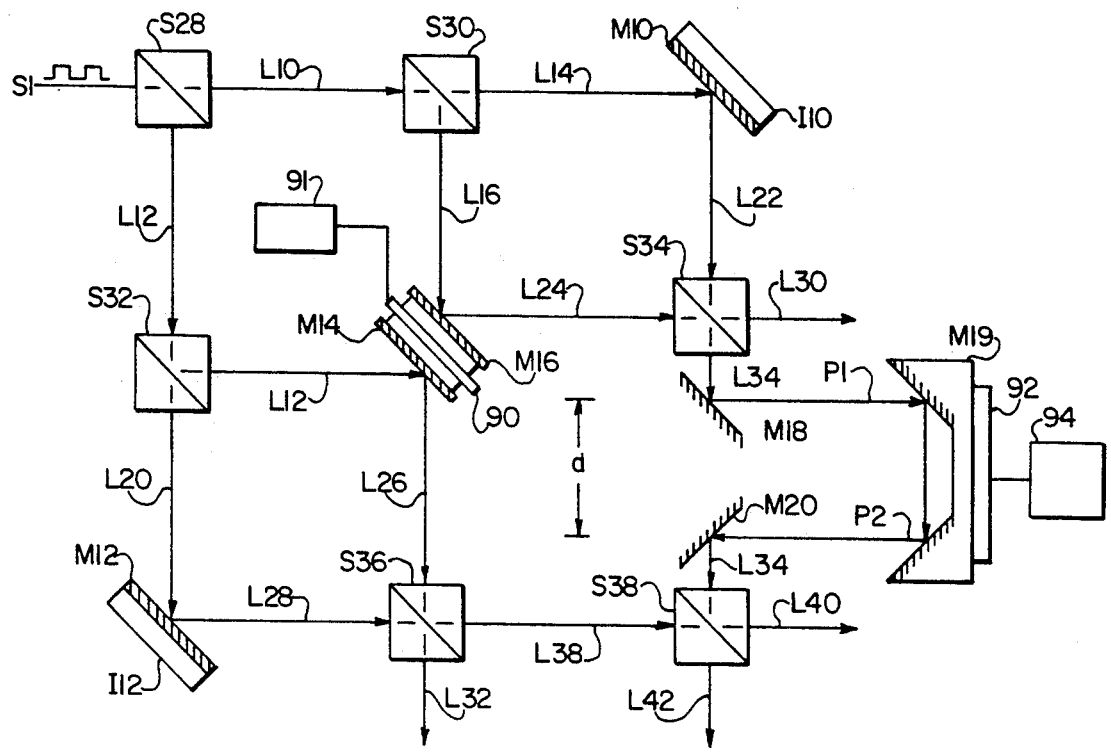
FIG. 9 is a depiction of a top view of an arrangement of interferometric modulators according to the invention used as a pulse width/amplitude modulator.

This application of the present invention comprises a light source S1, used with an arrangement of beamsplitters S28, S30, S32, S34, S36 and S38 in the arrangement as depicted in FIG. 9. The apparatus also comprises mirrors M10, M12, M14, M16, M18, M19 and M20 as shown in FIG. 9. The arrowed lines between the various components of FIG. 9, starting with light source S1, represent beams of light passing in the arrowed directions as indicated between the various components of the device according to the invention.

In operation as a full square wave pulse width/amplitude modulator, light from a single, coherent light source S1 (e.g. optical digital signal SO from beamsplitter S25 in FIG. 8) is incident on beamsplitter S28, where the light beam is separated into two independent paths indicated by the transmitted light portion L10 and the reflected light portion L12. Light beam portion L10 is incident upon beamsplitter S30 which causes it to split again into two independent halves as indicated by transmitted light beam portion L14 and reflected light beam portion L16. In a similar manner, light beam L12, which is incident on beamsplitter S32, is split into the two independent paths of transmitted light beam portion L20 and reflected light beam L18.

The transmitted light beam portion L14 and reflected light beam portion L16 are each reflected by mirrors M10 and M16, respectively. Mirror M16 is one side of a central reflecting mirror mounted on a piezoelectric crystal 90, which is controlled by voltage source 91. The crystal 90 is mounted on a stationary support which is central to the apparatus shown in FIG. 9. Reflected light beams L22 and L24 are recombined at beamsplitter S34. The recombination of light beams at S34 represents a first stage of the modulator and the components S28, S30, M10, M16 and S34 are one leg of this first stage.

The second leg of the first stage involves beamsplitter S32. Transmitted light beam portion L20 and reflected light beam portion L18 (from beamsplitter S32) impinge on and are reflected by mirrors M12 and M14, respectively. Reflected light beams L26 and L28 are recombined at beamsplitter S36 as the second leg of the first stage of the modulator. In either leg of the first stage, output light beams L30 (from beamsplitter S34) or L32 (from beamsplitter S36) may be a product signal or used as a feedback test point for adjustment and control of the modulator.

Figure 10:
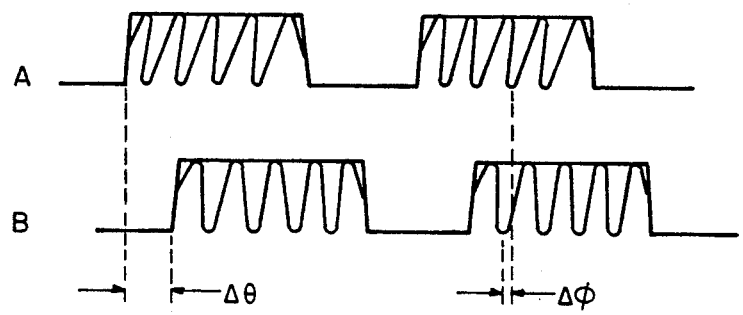
FIG. 10 illustrates the phase relationships of signals from each leg of the modulator shown in FIG. 9.

It should be noted that mirrors M10 and M12 could each be replaced with full interferometers illustrated only as I10 and I12 in FIG. 10. Each interferometer I10 and I12 would comprise a single beamsplitter and two mirrors on opposing optical paths. If this enhancement were incorporated for a specific application, the position of each mirror would be controlled using a piezoelectric crystal. This enhancement would permit the independent adjustment of the signal strength/pulse width of a single leg of either first stage side of the modulator.

As shown in FIG. 9, output light beam L34 is incident on mirrors M18, M19, and M20. Mirror M19 is a two-faced reflector which reflects the incident light along an output path P2 that is parallel to the input path P1, the input and output paths being displaced a distance d, as shown in FIG. 9. The position of compound mirror M19 is controlled by piezoelectric crystal 92, which is mounted to mirror M19 and connected to a voltage source 94, which generates a signal of given amplitude and frequency. This configuration permits the independent adjustment of one leg (e.g. light beam L34) of the second stage of the modulator relative to the other leg (i.e. light beam L38). Signals L32 and L38 are analogous to signals L30 and L34, respectively, except for the phase difference introduced by differing optical path lengths.

A final output signal is available at each of the two faces of beamsplitter S38. The form of these output signals L40 and L42 is a function of the input signals L38 and L34. The relative phase and amplitude of these input signals are adjusted by mirrors M14, M16, M19, and optionally M10 and M12. Each of these mirrors may have their relative positions changed by a piezoelectric crystal (e.g. 90 and 92) under control of a voltage source (e.g. 91 and 94). The exact adjustment of the mirrors to achieve an optimal result is determined empirically, as is conventional. Neutral density filters, not shown, are optional for calibration.

Figure 11:
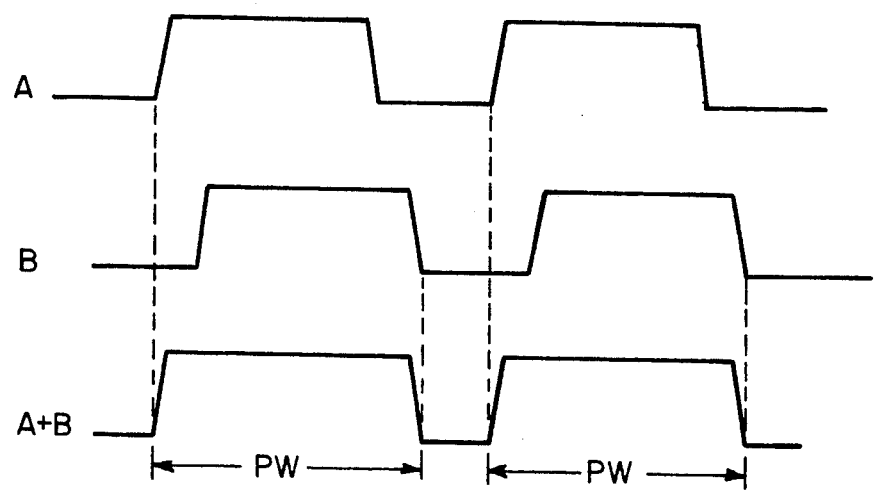
FIGS. 11, 12 and 13 illustrate possible output signal waveforms when the modulator shown in FIG. 9 is utilized as a pulse width modulator, digital frequency modulator and amplitude modulator, respectively.

FIG. 10 illustrates and defines certain relationships which will help to describe the various functions which the embodiment of FIG. 9 is capable of performing. As mentioned previously, the relative phase and amplitude of the input signals L34 and L38 will determine the shape of the output signals L40 and L42. These input signals will be an optical digital signal, as in the form of S1. This digital signal is an envelope for the underlying carrier signal that is in the form of a sinusoid, such as S' in FIG. 4 and A and B in FIG. 10. The relative phase of the digital signal envelope of one input signal to the other and the relative phase of the carrier signal of one input signal to the other will determine the shape of the output signals L40 and L42. These phase relationships are adjusted by the mirrors of FIG. 9, with specific adjustments to achieve specific phase relationships being determined empirically. Referring to FIGS. 9-11, the phase difference between the digital signal envelopes of the two input signals L34 of FIG. 9 (e.g. A in FIG. 10), and L38 of FIG. 10 (e.g. B in FIG. 10) is shown as $\Delta\Theta$. The phase difference between the carrier signals of the two input signals L34 and L38 is shown as $\Delta\phi$. FIG. 11 illustrates the summing of two digital signals with envelope phase difference of $\pi/4$ and carrier signal phase difference of $\pi/2$ to generate a combined signal of approximately equal amplitude as each signal and pulse width increase of 150%.

Figure 13:
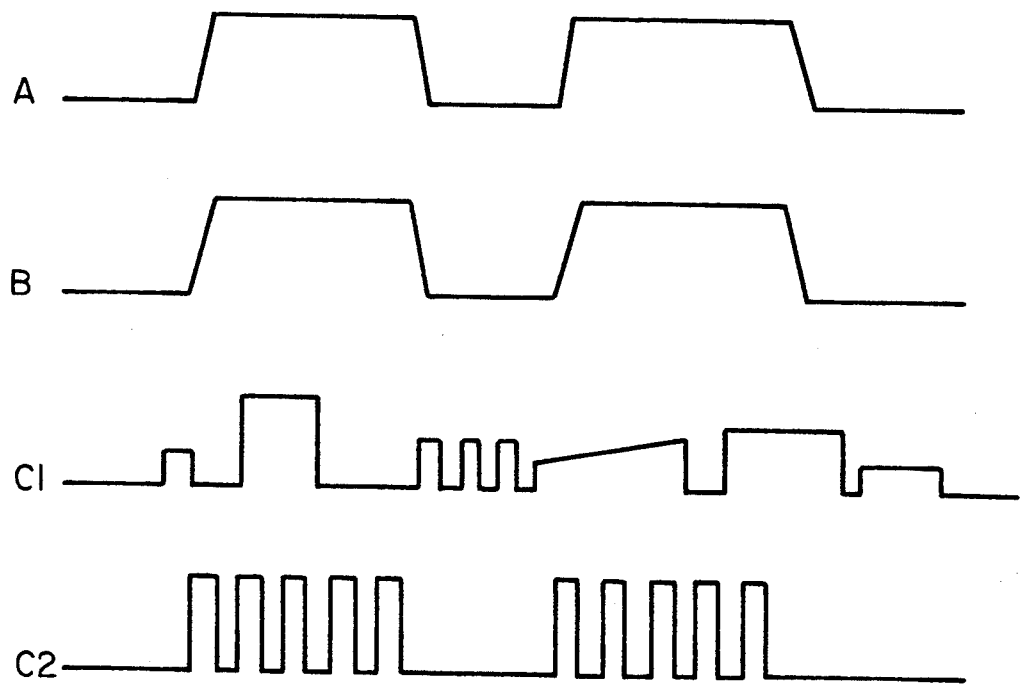

FIG. 13 illustrates that by changing the phase differences in the envelope and carrier signals, through adjustment of the mirrors, the embodiment of FIG. 9 can be utilized as a pulse width modulator 13A, frequency doubler 13B, amplitude modulator 13C, and a pulse/phase inverter 13D. In these figures only the phase shift $\Delta\phi$ in the digital signal envelope is depicted, for simplicity. The value of the carrier phase difference $\Delta\theta$ is provided. A $\Delta\theta = \pi/2$ value maintains approximately constant signal strength.

FIG. 11 illustrates the utilization of the apparatus of FIG. 9 as a pulse width modulator through adjustment of the mirrors, described previously, so that the phase difference of the envelope is $\pi/2$ and the phase difference of the input carrier signals is $\pi/2$. For example the wave form A of FIG. 11 is the input signal L38 of FIG. 9 from one leg of the first stage of the modulator, wave form B is input signal L34 from the other leg, and the wave form resulting from A+B is the output signal L42 or L40 from the second stage beamsplitter (i.e. beamsplitter S38). In this example, the pulse width of the output (PW in FIG. 11) is greater than (approximately 150%) the pulse width of the input signals. With the configuration of FIG. 9 it is possible to have pulse width modulation with a duty cycle from >0 to <1.

Figure 12:
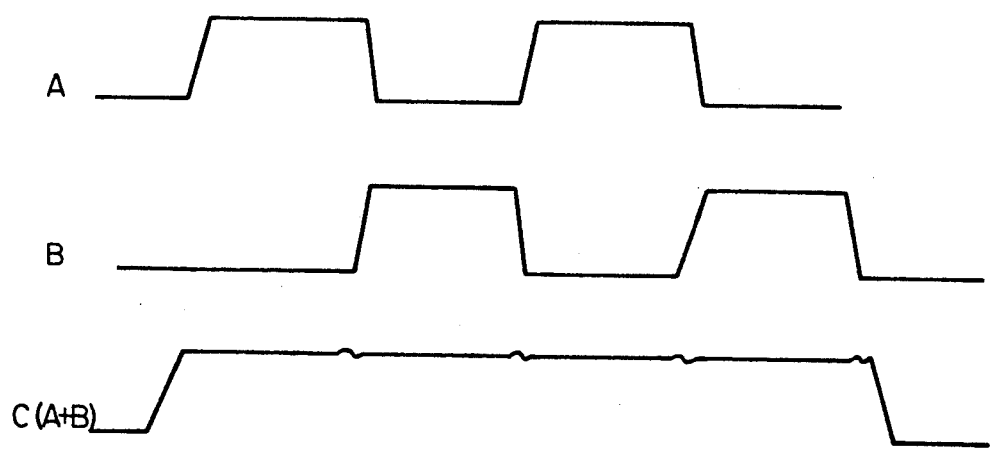
Figure 12:
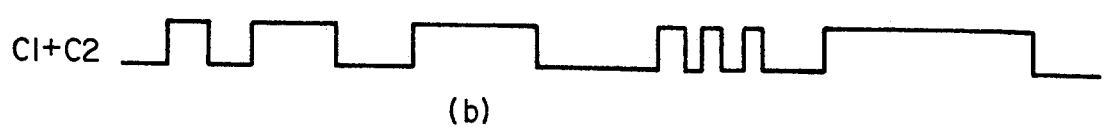

FIG. 12 illustrates the utilization of the apparatus of FIG. 9 as a digital frequency modulator. First, it must be assumed that one or both input signals L32 and L34 are tuned full wave pulses with approximately a 100% duty cycle, i.e. in the shape of wave form C in FIG. 12a. This wave form could be achieved using either first stage of the apparatus of FIG. 9 as a pulse width modulator which yields a full wave pulse. Each full wave pulse (C in FIG. 12a), e.g. L34 and L38 of FIG. 9, would be fed into a second stage modulator which will act as the frequency modulator. Alternately, one full wave pulse (C in FIG. 12A), e.g. L34 or L38 of FIG. 9, would be combined with a pulse width modulated signal (A+B in FIG. 11), e.g. L38 or L34 of FIG. 9, to be fed into a second stage modulator which will act as a digital signal frequency modulator. If inputs L32 and L34 are in the shape of wave form C in FIG. 12a and if piezoelectric crystal 92 is modulated in a controlled fashion, e.g. such that $A_1 \sin \tau_1 t = A_2 \sin (\tau_2 t \pm (2\mu+1)\pi)$ (minimum interference condition) the signal amplitude is approximately zero or $A_1 \sin \tau_1 t = A_2 \sin (\tau_2 t \pm 2\pi)$ (maximum interference condition) the signal amplitude is maximized at approximately $A_1 + A_2$ where $\tau_1$ and $\tau_2$ are optical carrier frequencies, t=time, $A_1$ and $A_2$ are optical carrier amplitudes and $\mu$ is an integer value $\geq 0$. If it is assumed that $A_1 \sin \tau_1 t = A_2 \sin (\tau_2 t + ((2\mu+1)/2)\pi)$ then, when inputs L32 (e.g. C1) and L34 (e.g. C2) are combined at beamsplitter S38 the output signal L40 or L42 will be in the wave form of FIG. 12a, labelled C1+C2. If a second modulating signal (also a digital signal) is introduced, such that a phase difference of $\phi$ or $((2\mu+1)/2)\pi$ is added to $A_2 \sin (\tau_2 t + ((2\mu+1)/2)\pi)$ such that $A_1 \sin \tau_{10} t = A_2 \sin (\tau_2 t + ((2\mu+1)/2)\pi + \nu((2\mu+1)/2)\pi)$ where $\nu$ is the envelope frequency of the modulating digital signal, then a frequency modulated digital signal such as shown in FIG. 12b is possible and the frequency modulation will be a function of $A_1$, $A_2$, $\tau_1$, $\tau_2$, and t.

FIG. 13 illustrates the utilization of the apparatus of FIG. 9 as an amplitude modulator. In this application the phase shift of the envelope will be near zero and remain effectively constant. The phase shift of the carrier will be variable. Thus when the input signals L38 (e.g. A in FIG. 13) and L34 (e.g. B in FIG. 13) may be combined to yield a resultant signal which is a multiplexed or a frequency modulated digital signal (C2 in FIG. 13). A phase/amplitude modulated signal (FIG. 13, C1) is also possible.

Various other applications of the interferometric modulator of FIG. 9 will occur to those having skill in the art. For example, pulse width modulation of the input signal S1 is provided when the signals L32 and L34 are digital waveform signals and the piezoelectric crystal 92 is modulated in a controlled fashion such that the carrier signal phase difference is maintained at approximately $\pi/2$ for each stable state time duration of the modulating signal and the phase difference in the digital waveform phase difference varies between 0 and $2\pi$. Amplitude modulation is provided when the phase difference in the digital waveforms is zero and the carrier signals phase difference is variable between 0 and $2\pi$. A precision frequency doubler is provided when the phase difference in the digital waveforms is $\pi/2$ and the carrier signals phase difference is $\pi$. A precision frequency doubler can function as a precision frequency quadrupler by introducing a phase difference in the primary (e.g. L28, L22) and secondary (e.g. L26, L24) signals such that the digital waveform phase difference is $\pi/2$ and the carrier signal phase difference is $\pi$ at each leg of the first stage and at the second stage simultaneously.

An Optical Memory Cell

Figure 14:
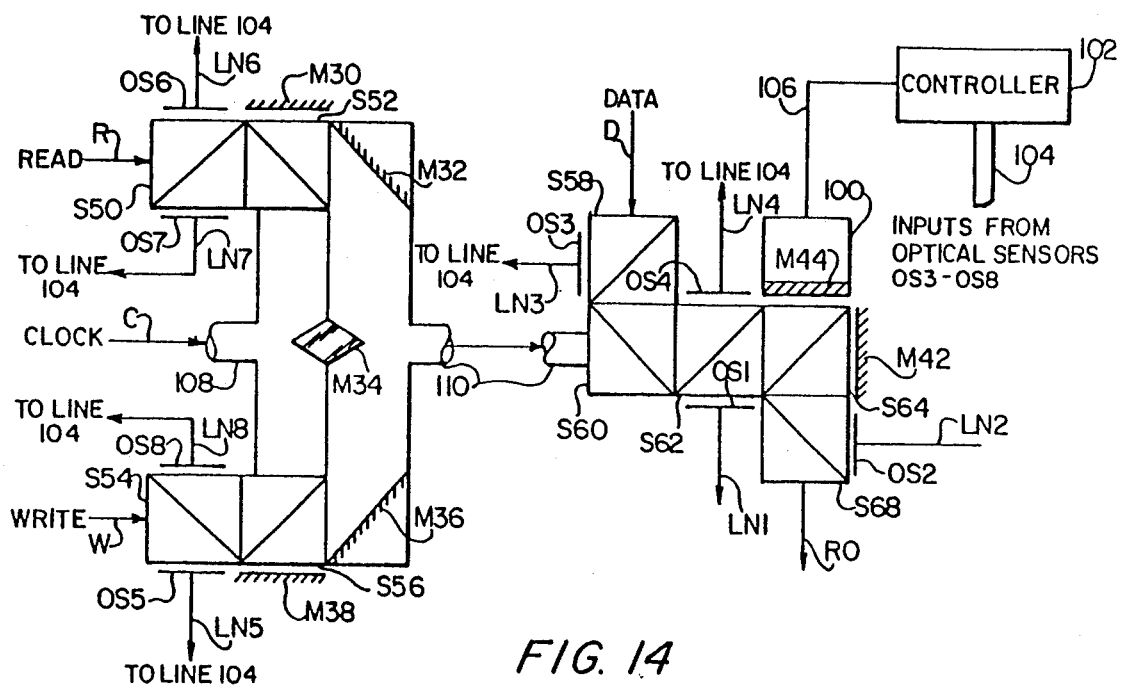
FIG. 14 illustrates the optical memory cell embodiment of the present invention.

A further embodiment of the present invention utilizes the basic interferometric modulator principles of the present invention, described previously, to provide a bi-stable interferometric cell that functions as an optical memory. FIG. 14 illustrates this embodiment, which utilizes a conventional programmable controller 102. Controller 102 is programmed in a conventional manner to interpret signals on input line 104, which may be a multi-conductor wire or a multi-conducting fiber optic cable for receiving inputs from optical sensors (e.g. photo sensors) OS3-OS8.

The state table of FIG. 14 shows an example process interpretation for controller 102 based upon the binary state of optical sensor inputs OS3–OS8. The controller 102 generates an output signal, e.g. either electrical (i.e. a voltage level) or optical (i.e. an intensity level) on line 106. The signal on line 106, the level of which is controlled by controller 102, is applied to piezoelectric crystal 100, which responds by expanding or contracting in the dimension normal to the mirrored surface M44. In the case of an optical input signal, the piezoelectric crystal must also be made photosensitive either through attachment of a CCD, photovoltaic cell, or by doping the piezoelectric ceramic directly. This change in position of the mirrored surface M44 causes a change in the optical path length from mirrored surface M4 to the beam splitting interface of beamsplitter S64. When the apparatus of FIG. 14 is utilized as an optical memory, beamsplitter S64 functions as the "storage cell" with its contents being detected by optical sensor OS2 (e.g. photo sensor), which can be connected to a control or input/output device (not shown) by line LN2.

In the state table of FIG. 14, the contents of the memory or storage cell as indicated by OS2 with 0 indicating no light signal detection and 1 indicating light signal detection. The contents of the memory cell is determined by controller 102 which processes inputs from optical sensors OS3–OS8 and applies a signal on line 106 to change the optical path length as a pre-programmed response to inputs from optical sensors OS3–OS8 and thereby determine if light is (1) or is not (0) detected by optical sensor OS2. The state table of FIG. 14 indicates a preferred interpretation of the process which could be implemented in an optical memory according to the apparatus of FIG. 14. Controller 102 could be programmed using conventional and straightforward techniques to provide other processing results. Using six controller inputs, OS3–OS8, 64 states are possible. It should be noted that although the state table shows only 19 states, states 17, 18, and 19 may be expanded into further states to cover specific values of x for signal lines OS3–OS6. States 17–19 are required to handle ambiguities in the clock signal since this signal, in the design of the present invention, should interfere destructively on recombination at the beamsplitting interface of S60.

The operation of the apparatus of FIG. 14, in accordance with the preferred process interpretation of the state table, will now be discussed. The input signal on line C is an optical CLOCK signal produced by a digital photonic clock such as the digital photonic clock of the present invention, as previously described. The input READ and WRITE signals on line R and W respectively are also digitized optical signals. In accordance with the preferred state table of FIG. 14, a WRITE signal impinges on beamsplitter S54, and a CLOCK signal (in phase with the WRITE signal) is received on line C and travels along fiber optic 108 and is split and reflected by mirrored surface M34. These WRITE and CLOCK signals combine at the beamsplitting interface of beamsplitter S56.

The WRITE signal is detected by optical sensor OS5, which is connected to controller 102 by lines LN5 and 104. A portion of the WRITE signal is reflected by the beamsplitting interface of beamsplitter S54 and is detected by OS5, and a portion of the WRITE signal is transmitted to beamsplitter S56. A portion of the CLOCK signal is reflected by beamsplitter S56 and again by beamsplitter S54. This reflected portion of the clock signal is detected by optical sensor OS8 and is used in fault detection processing. The transmitted portion of the CLOCK signal from beamsplitter S56 is reflected by static mirror M38 and is then reflected again by beamsplitter S56. Mirror M38 is static for purposes of digital signal processing. However, it is contemplated that mirrors M30, M32, M36, and M38 would be movable for the purposes of both off-line calibration and dynamic calibration as an overhead process. This movement may be accomplished by attached piezoelectric crystals. The calibration methods and specific apparatus used will be a function of the specific application. The portion of the CLOCK signal reflected by M38 and subsequently by S56 combines in phase with the transmitted portion of the WRITE signal. The superposition of these signals is reflected by mirror M36 and then by multifaceted mirror M34. This signal is combined with the portion of the CLOCK signal that is transmitted by beamsplitter S52, reflected by static mirror M30, reflected again by beamsplitter S52, and then by mirror M32, and finally by one of the surfaces of mirror M34.

Due to the phase relationship of the CLOCK signal and WRITE signal, the two CLOCK signal portions that are recombined and transmitted through optical fiber (or waveguide) 110 and the WRITE signal interfere with each other such that only the WRITE signal remains to impinge upon the interface of beamsplitter S60. In the apparatus of FIG. 14, the CLOCK signal acts as a synchronizing signal for the control signal (WRITE) and the data signal to be discussed hereinafter. As discussed, the synchronizing signal (CLOCK) is effectively removed, thus preserving the integrity of the control (WRITE) signal and data signal. The phase of the CLOCK and WRITE signals are maintained by dynamic calibration of mirrors M30, M32, M36, and M38 in response to the optical sensor signals from OS5, OS6, OS7, and OS8 (see state table of FIG. 14).

The DATA signal on line D is gated into the apparatus of FIG. 14 using the same CLOCK signal. For simplicity, the apparatus for gating the DATA signal, which is identical to the apparatus for gating the WRITE signal, is not illustrated in FIG. 14. A portion of the DATA signal that is clocked in is reflected by beamsplitter S58 and detected by optical sensor OS3, which is connected to controller 102 by lines LN3 and 104. The transmitted portion of the DATA signal is combined with the WRITE signal at the interface of beamsplitter S60. These signals interfere constructively, at the beamsplitting interface of beamsplitter S60. Beamsplitter S60, oriented as shown relative to beamsplitters S58 and S62, provides an optical isolation stage. This preferred orientation isolates the control signals from the data signals in this preferred arrangement. Note that the relative orientations of beamsplitter pairs S50, S52 and S54, S56 also provide optical signal isolation. The resultant signal is reflected and transmitted by beamsplitter S62. The reflected portion is detected by optical sensor OS4, which is connected to controller 102 by lines LN3 and 104. The transmitted portion is incident on beamsplitter S64. Optical sensor OS1 is provided for optional control and/or feedback and could be connected to a controller or input/output device (not shown) via line LN1.

As mentioned previously, beamsplitter S64 functions as the storage cell of this optical memory device. In accordance with the state table of FIG. 14, controller 102 is programmed so that if states 7 or 15 occur, the value detected by optical sensor OS3 (i.e. 0=no light detected, 1=light detected) will be "written" to memory by the controller 102 by adjusting the signal on line 106 to piezoelectric crystal 100 until the values detected by optical sensors OS3 and OS2 match. The output signal from controller 102 is maintained to store the value written to the memory cell.

A READ operation in the device of FIG. 14 is very similar to the WRITE operation, previously described. A READ signal incoming on line R is handled by system elements, analogous to the WRITE signal. Beamsplitters S50 and S52 perform the same function for the READ signal as do the beamsplitters S54 and S56, respectively, for the WRITE signal. Similarly mirrors M30 and M32 perform analogous functions to mirrors M38 and M36, respectively. The incoming READ signal is detected by optical sensor OS6, which is connected to controller 102 by lines LN6 and 104. As discussed with reference to the WRITE operation, in a READ operation, the CLOCK signal, having been split and reflected, recombines destructively so that only the READ signal impinges on beamsplitter S60.

The relationship of the READ and WRITE signals will depend on the particular application in which the apparatus of FIG. 14 is used. The READ and WRITE signals may be generated independently of each other or may be controlled so that when input to beamsplitters S50 and S54, respectively, they interfere constructively or destructively. They may also be controlled to be out of phase by a specified value which would be empirically determined as a function of the specific application.

In the preferred embodiment, it is assumed that the READ and WRITE signals will combine out of phase to the extent that when the superposition of the READ and WRITE signals is combined with an incoming DATA signal the READ and WRITE signals interfere destructively. Even in a READ operation, a DATA signal may be input on line D and detected by optical sensor OS3. This capability supports an "if data found" logic operation, an operation in which the signal on the data line is filtered by the memory state. The result is output directly for this state (14 in state table) at RO. A passive form of an "if data found" logic operation is also supported (see state 13 in state table). Passive refers to the condition in which no READ command is present, but data is filtered by the unchanged memory state as determined by the position of M44. Again utilization of the apparatus of FIG. 14 will depend on the specific application. In the "if data found" application, the READ signal must interfere constructively with the DATA signal. When the READ and DATA signals interfere constructively at the interface of beamsplitter S60, the resulting signal is reflected and transmitted by beamsplitter S62. The transmitted portion is incident on beamsplitter S64, and the reflected portion is detected by optical sensor OS4.

During the READ operation, the resultant output signal, available on line RO and detected by sensor OS2, is a function of the position of mirrored surface M44. If the mirrored surface M44 is positioned for constructive interference at the optical combining interface of beamsplitter S64 (i.e. by a previous write operation that wrote a "1" to memory), then the READ signal becomes the output (on line RO) of memory. The read access time is limited only by the optical clock rate. If the mirrored surface M44 is positioned for destructive interference at the optical combining interface of beamsplitter S64 (i.e. by a previous write operation that wrote a "0" to memory), then a null (0) signal is present on line RO and detected by optical sensor OS2, independent of the READ signal. In this instance the READ operation will yield a null, or binary 0, result. With reference to the state table of FIG. 14, the results of read operations are indicated by states 6 or 14.

The apparatus of FIG. 14 can be used in a wide variety of applications. For example, referring to the state table of FIG. 14, state 13 is a special case where data is present but neither a READ or WRITE signal is present. In this instance, the memory cell can be used as a logical "go/no go" data pass-through filter. The memory acts as a passive "if data present" logical element where data is passed through only if the memory has a "1" stored when the data signal is incident on beamsplitter S58.

Various modifications and variations will occur to those skilled in the art to which this invention pertains. For example, the interferometry architecture described herein may be modified according to the individual needs of the system being designed. The system could be constructed using various numbers of beamsplitters and mirrored surfaces based upon the general principles as set forth herein. To illustrate, rather than having two sets of four beamsplitters attached to the central solid web (FIGS. 4 through 8), and the pair of mirrored surfaces associated with each beamsplitter in one of the sets containing four beamsplitters, there could be many more sets in the arrangement, and each set could comprise more or less than the four beamsplitters presented herein in the preferred embodiment.

Also, although the system has been illustrated as a digital device, i.e., in providing a pulsed output, it could likewise be constructed using analog circuit principles in modulating, something short of an on/off condition, an optical signal without the confines of solid state materials as heretofore used in the art. Further, the electro-mechanical control for fine tuning of the reflected mirror surfces could be a part of a microprocess or a computer-controlled feedback system to provide automatic fine tuning adjustment of the mirrored surface positions.

I claim:

1. An interferometric modulator for electromagnetic signals comprising:
   means for providing an electromagnetic input signal having a first fundamental frequency;
   beamsplitter means for receiving said electromagnetic input signal and separating said input signal into a reflected signal and a transmitted signal having a respective phase relationship;
   first means for providing a first modulating signal;
   a first reflecting means positioned a first distance from said beamsplitter means for receiving said reflected signal and returning said reflected signal to said beamsplitter means, said reflected signal having an optical path length determined by said first distance;
   a second reflecting means positioned a second distance from said beamsplitter means for receiving said transmitted signal and returning said transmitted signal to said beamsplitter means, said transmitted signal having an optical path length determined by said second distance;
   said first reflecting means including a modulating means responsive to said first modulating signal for varying said first distance and said reflected signal optical path length, wherein said respective phase relationship between said reflected and transmitted signals varies as said first distance is varied; and wherein said beamsplitter means combines said returned reflected and transmitted signals into a modulated output signal having a second fundamental frequency determined by said varying phase relationship; and wherein said first reflecting means includes a first piezoelectric crystal that has a distance of movement of 50 to 500 times lambda, where lambda is the wavelength of said electromagnetic input signal.

2. An interferometric modulator for electromagnetic signals comprising:

means for providing an electromagnetic input signal having a first fundamental frequency;

beamsplitter means for receiving said electromagnetic input signal and separating said input signal into a reflected signal and a transmitted signal having a respective phase relationship;

first means for providing a first modulating signal;

a first reflecting means positioned a first distance from said beamsplitter means for receiving said transmitted signal and returning said transmitted signal to said beamsplitter means, said transmitted signal having an optical path length determined by said first distance;

a second reflecting means positioned a second distance from said beamsplitter means for receiving said reflected signal and returning said reflected signal to said beamsplitter means, said reflected signal having an optical path length determined by said second distance;

said first reflecting means including a modulating means responsive to said first modulating signal for varying said first distance and said transmitted signal optical path length, wherein said respective phase relationship between said transmitted and reflected signals varies as said first distance is varied; and wherein said beamsplitter means combines said returned transmitted and reflected signals into a modulated output signal having a second fundamental frequency determined by said varying phase relationship; and wherein said first reflecting means includes a first piezoelectric crystal that has a distance of movement of 50 to 500 times lambda, where lambda is the wavelength of said electromagnetic input signal.

3. An interferometric modulator according to claim 1 or claim 2 wherein said first piezoelectric crystal includes a mirrored surface.

4. An interferometric modulator according to claim 3 wherein said first piezoelectric crystal is responsive to said first modulating signal for varying said reflected or transmitted signal optical path length.

5. An interferometric modulator according to claim 4 wherein said first means for providing a first modulating signal includes a voltage generator.

6. An interferometric modulator according to claim 5 wherein said voltage generator produces a first modulating signal of predetermined amplitude and frequency.

7. An interferometric modulator according to claim 6 further including second means for providing a second modulating signal and wherein said second reflecting means includes a second modulating means responsive to said second modulating signal.

8. An interferometric modulator according to claim 7 wherein said second means for providing a second modulating signal includes a voltage generator for producing a second modulating signal of predetermined amplitude and frequency, and phase relative to said first modulating signal.

9. An interferometric modulator according to claim 8 wherein said second reflecting means includes a second piezoelectric crystal having a mirrored surface.

10. An interferometric modulator according to claim 9 wherein said second piezoelectric crystal is responsive to said second modulating signal for varying said transmitted or reflected signal optical path length.

11. An interferometric modulator according to claim 1 or claim 2 wherein said electromagnetic signal has a predetermined frequency in the optical range.

12. An interferometric modulator according to claim 1 or claim 2 wherein said electromagnetic signal has a predetermined frequency in the ultraviolet range.

13. An interferometric modulator according to claim 1 or claim 2 wherein said electromagnetic signal has a predetermined frequency in the infrared range.

14. An interferometric modulator for producing a square wave electromagnetic signal from a sinusoidal electromagnetic signal comprising:

means for providing a sinusoidal electromagnetic input signal;

first beamsplitter means for receiving said electromagnetic input signal and for splitting said signal into a plurality of signal portions, said first beamsplitter means including a first plurality of beamsplitters;

second beamsplitter means for receiving said plurality of signal portions, said second beamsplitter means including a second plurality of beamsplitters aligned with one another, each second beamsplitter being positioned to receive one of said plurality of signal portions and for splitting said signal portions into a reflected portion and a transmitted portion;

piezoelectric crystal means comprising a plurality of pairs of piezoelectric crystals, each pair consisting of two crystals arranged at an opposing angle to one another with respect to an associated one of said second plurality of beamsplitters, each of said two crystals being positioned adjacent to a said respective second beamsplitter for receiving said reflected and transmitted signal portions, for modulating at least one of said reflected and transmitted portions, and for returning said signal portions including said at least one modulated portion to said respective second beamsplitter;

wherein said returned signal portions including said at least one modulated portion recombine in each said respective second beamsplitter to form a plurality of first modulated signals, each associated with one of said plurality of second beamsplitters; and third beamsplitter means for receiving said plurality of first modulated signals, said third beamsplitter means comprising a plurality of third beamsplitters, each positioned relative to a respective second beamsplitter for receiving a first modulated signal from a respective second beamsplitter, said plurality of third beamsplitters being aligned with on another to combine said plurality of first modulated signals into a square wave output signal.

15. An interferometric modulator according to claim 14 further comprising support means in the form of an inverted T on which said second and third beamsplitter means and said piezoelectric crystal means are mounted.

16. An interferometric modulator according to claim 14 wherein said second and third beamsplitter means each comprises two sets of at least two beamsplitters aligned horizontally in a row wherein the row of said third beamsplitters is directly above the row of said second beamsplitters, and said piezoelectric crystal means comprises at least eight piezoelectric crystals consisting of four pairs of crystals wherein each crystal of said pair faces adjacent sides of a respective second beamsplitter.

17. An interferometric modulator according to claim 14 wherein each said piezoelectric crystal includes a mirrored surface for returning said reflected and transmitted signal portions back to a respective said second beamsplitter.

18. An interferometric modulator according to claim 14 further comprising an electric signal source means for producing a modulating signal applied to one crystal in each of said crystal pairs for modulating said reflected and transmitted light portion associated with each said second beamsplitter.

19. An interferometric modulator for modulating a digital waveform electromagnetic signal comprising:
means for providing a digital waveform electromagnetic input signal;
an input beamsplitter means for receiving said input signal and for dividing said input signal into first and second signal portions;
a first modulation means for modulating said first signal portion and a second modulation means for modulating said second signal portion and,
an output beamsplitter means for receiving said first modulated signal and said second modulated signal and for combining said first and second modulated signals into a final modulated output signal and
wherein said first modulation means comprises at least one beamsplitter for receiving said first signal portion and for dividing said first signal portion into a first signal reflected portion and a first signal transmitted portion, and a first piezoelectric crystal for receiving said first signal reflected portion.

20. An interferometric modulator according to claim 19 further including an electric signal generator for producing a first modulating signal, said first piezoelectric crystal being responsive to said modulating signal for modulating said first signal reflected portion to produce a modulated first signal reflected portion.

21. An interferometric modulator according to claim 20 wherein said second modulation means comprises at least one beamsplitter for receiving said second signal portion and for dividing said second signal portion into a second signal reflected portion and a second signal transmitted portion, and a second piezoelectric crystal for receiving said second signal reflected portion.

22. An interferometric modulator according to claim 21 wherein said second piezoelectric crystal is responsive to said modulating signal for modulating said second signal reflected portion to produce a modulated second signal reflected portion, and wherein said modulated first and second signal portions are responsive to said output beamsplitter means to produce said modulated output signal.

23. An interferometric modulator according to claim 22 wherein said second modulation means further includes a second electric signal generating means for producing a second modulating signal and a third piezoelectric crystal responsive to said second modulating signal for modulation of said second signal portion independent of modulation of said first signal portion.

24. An interferometric modulator according to claim 23 wherein said first and second signal portions comprise a digital waveform generated from an underlying carrier signal, and wherein the first signal portion digital waveform and carrier signal are in phase with the second signal portion digital waveform and carrier signal.

25. An interferometric modulator according to claim 24 wherein said third piezoelectric crystal is responsive to said second electric signal generating means for causing a phase difference between said first signal portion digital waveform and carrier signal and said second signal portion digital waveform and carrier signal.

26. An interferometric modulator according to claim 25 wherein said phase difference between first and second signal portion digital waveforms is $\pi/2$ and the phase difference between first and second signal portion carrier signals is approximately $\pi/2$, whereby said modulated output signal has a pulse width duty cycle that is approximately 150% of either first or second signal portion pulse width duty cycle.

27. An interferometric modulator according to claim 26 wherein said first and second signal portions are digital waveform signals and said second electric signal generating means provides a controlled variable modulating signal such that carrier signal phase difference is maintained at $\pi/2$ for each stable state time duration of the said second electric signal and the digital waveform phase difference varies between 0 and $\pi$, whereby pulse width modulation of said input signal is provided.

28. An interferometric modulator according to claim 25 wherein said phase difference between first and second signal portion digital waveforms is approximately zero and fixed, and the phase difference between first and second signal portion carrier signals is variable between 0 and $\pi$, whereby amplitude modulation of said input signal is provided.

29. An interferometric modulator according to claim 25 wherein said phase difference between first and second signal portion digital waveforms is $\pi/2$ and said phase difference between first and second signal portion carrier signals is $\pi$, whereby a precision frequency doubler of said input signal is provided.

30. An interferometric modulator according to claim 29 wherein each of said first and second signal portions is comprised of a primary signal and a secondary signal each comprising a digital waveform generated from an underlying carrier signal, and wherein the digital waveforms of said primary and secondary signals have a phase difference of $\pi/2$ and the carrier signals of said primary and secondary signals have a phase difference of $\pi$, whereby a precision frequency quadrupler of said input signal is provided.

31. An interferometric modulator for providing memory storage of an optical data signal comprising:
first beamsplitter means for receiving an optical data signal and for dividing said data signal into a reflected data signal and a transmitted data signal and first optical sensing means for sensing said reflected data signal;
second beamsplitter means for receiving an optical memory operation signal and for combining said data and operation signals to produce a resultant signal, and second optical sensing means for sensing said operation signal and third optical sensing means for sensing said resultant signal;

piezoelectric crystal means with a mirrored surface, and controller means responsive to said first, second, and third optical sensing means for producing a controlling signal;

said piezoelectric crystal means being responsive to said controlling signal for altering the position of said mirrored surface, said mirrored surface arranged to reflect a portion of said resultant signal; and third beamsplitter means for receiving a portion of said resultant signal and a signal from said mirrored surface and for combining said received signals into an output signal which indicates the contents of the optical memory storage.

32. An interferometric modulator according to claim 31 further including third beamsplitter means for initially receiving said operation signal and a clock signal, said third beamsplitter means comprising at least one beamsplitter and one mirror arranged to combine said operation and clock signals.

33. An interferometric modulator according to claim 32 operation signal is a read signal.

34. An interferometric modulator according to claim 32 wherein said operation signal is a write signal.

35. An interferometric modulator according to claim 31 wherein said first and second beamsplitter means are oriented to provide optical isolation between said operation signal and said data signal.

36. An interferometric modulator according to claim 31 including optical sensing means for detecting data even without a write signal, thereby providing an if-data-found logical operation.

37. An interferometric modulator according to claim 36 wherein said logical operation is passive.

38. An interferometric modulator according to claim 36 wherein said logical operation is active.

39. An interferometric modulator for electromagnetic signals comprising:

means for providing an electromagnetic input signal having a first fundamental frequency;

beamsplitter means for receiving said electromagnetic input signal and separating said input signal into a reflected signal and a transmitted signal having a respective phase relationship;

first means for providing a first modulating signal;

a first reflecting means positioned a first distance from said beamsplitter means for receiving said reflected signal and returning said reflected signal to said beamsplitter means, said reflected signal having an optical path length determined by said first distance;

a second reflecting means positioned a second distance from said beamsplitter means for receiving said transmitted signal and returning said transmitted signal to said beamsplitter means, said transmitted signal having an optical path length determined by said second distance;

said first reflecting means including a modulating means responsive to said first modulating signal for varying said first distance and said reflected signal optical path length, wherein said respective phase relationship between said reflected and transmitted signals varies as said first distance is varied; and wherein said beamsplitter means combines said returned reflected and transmitted signals into a modulated output signal having a second fundamental frequency determined by said varying phase relationship; and wherein said first reflecting means includes a first piezoelectric crystal, said first piezoelectric crystal includes a mirrored surface, and said first piezoelectric crystal is responsive to said first modulating signal for varying said reflected or transmitted signal optical path length; and wherein said first means for providing a first modulating signal includes a voltage generator and said voltage generator produces a first modulating signal of predetermined amplitude and frequency; and further including second mean for providing a second modulating signal and wherein said second reflecting means includes a second modulating means responsive to said second modulating signal and wherein said second means for providing a second modulating signal includes a voltage generator for producing a second modulating signal of predetermined amplitude and frequency, and phase relative to said first modulating signal; and wherein said second reflecting means includes a second piezoelectric crystal having a mirrored surface, and said second piezoelectric crystal is responsive to said second modulating signal for varying said transmitted or reflected signal optical path length.

* * * * *

UNITED STATES PATENT AND TRADEMARK OFFICE
CERTIFICATE OF CORRECTION

PATENT NO. : 5,315,370

DATED : May 24, 1994

INVENTOR(S) : Jeffrey A. Bulow

It is certified that error appears in the above-identified patent and that said Letters Patent is hereby corrected as shown below:

Claim 14, col. 18, line 64, change "on" to -- one --.

Claim 33, col. 21, line 24, before "operation" insert -- wherein said --.

Claim 39, col. 22, line 34, change "mean" to -- means --.

Signed and Sealed this

Twenty-eight Day of February, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,315,370

DATED : May 24, 1994

INVENTOR(S) : Jeffrey A. Bulow

It is certified that error appears in the above-indentified patent and that said Letters Patent is hereby corrected as shown below:

In col. 13, before line 1, the following table should be inserted:

STATE TABLE

N/A - NOT APPLICABLE
— - INDETERMINATE
TBD - TO BE DETERMINED

| STATES | CONTROLLER INPUTS OS- | | | | | MEMORY CONTENTS OS2 | DESCRIPTION/ OPERATION |
|---|---|---|---|---|---|---|---|
| | 3 | 4 | 5 | 6 | 7 | 8 | | |
| 1 | 0 | 0 | 0 | 0 | 1 | 1 | — | N/A |
| 2 | 0 | 0 | 0 | 1 | 1 | 1 | — | N/A (STATE NOT ATTAINABLE/OS4 FAILURE) |
| 3 | 0 | 0 | 1 | 0 | 1 | 1 | — | N/A (STATE NOT ATTAINABLE/OS4 FAILURE) |
| 4 | 0 | 0 | 1 | 1 | 1 | 1 | — | TBD (e.g. WAIT STATE) |
| 5 | 0 | 1 | 0 | 0 | 1 | 1 | — | TBD (e.g. FAULT, OS3 FAILURE, CLOCK NOT IN SYNC) |
| 6 | 0 | 1 | 0 | 1 | 1 | 1 | 0,1 | READ MEMORY CONTENT |
| 7 | 0 | 1 | 1 | 0 | 1 | 1 | 0 | WRITE 0 TO MEMORY |
| 8 | 0 | 1 | 1 | 1 | 1 | 1 | — | FAULT READ/WRITE ERROR |
| 9 | 1 | 0 | 0 | 0 | 1 | 1 | — | TBD (e.g. FAULT, OS4 FAILURE) |
| 10 | 1 | 0 | 0 | 1 | 1 | 1 | — | TBD (e.g. FAULT, READ/DATA SYNC ERROR) |
| 11 | 1 | 0 | 1 | 0 | 1 | 1 | — | TBD (e.g. FAULT, WRITE/DATA SYNC ERROR) |
| 12 | 1 | 0 | 1 | 1 | 1 | 1 | — | TBD (e.g. FAULT, READ/WRITE ERROR, SYNC ERROR) |
| 13 | 1 | 1 | 0 | 0 | 1 | 1 | 0,1 | LOGIC PROCESS, CONDITIONAL DATA PASS |
| 14 | 1 | 1 | 0 | 1 | 1 | 1 | 0,1 | LOGIC PROCESS, READ MEMORY AND DATA PRESENT |
| 15 | 1 | 1 | 1 | 0 | 1 | 1 | 1 | WRITE 1 TO MEMORY |
| 16 | 1 | 1 | 1 | 1 | 1 | 1 | — | READ/WRITE ERROR INPUT DATA LOST |
| 17 | x | x | x | x | 1 | 0 | | FAULT, LOCAL CLOCK INTERFACE FAILURE, WRITE SIDE |
| 18 | x | x | x | x | 0 | 1 | | FAULT, LOCAL CLOCK INTERFACE FAILURE, READ SIDE |
| 19 | x | x | x | x | 0 | 0 | | FAULT, CLOCK FAILURE, CLOCK/SYNC FAILURE |